(12) United States Patent
Rotermund et al.

(10) Patent No.: US 6,284,812 B1
(45) Date of Patent: *Sep. 4, 2001

(54) THERMALLY STABLE RIGID FOAMS BASED ON ISOCYANATE AND HAVING LOW BRITTLENESS AND LOW THERMAL CONDUCTIVITY

(75) Inventors: Udo Rotermund, Ortrand; Renate Hempel, Ruhland; Holger Seifert, Hüde; Werner Schmiade, Lembruch, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/159,798

(22) Filed: Sep. 24, 1998

(30) Foreign Application Priority Data

Sep. 24, 1997 (DE) ............................................. 197 42 012

(51) Int. Cl.⁷ .................................................. C08G 18/04
(52) U.S. Cl. ............................................. 521/174; 521/131
(58) Field of Search ..................................... 521/131, 174

(56) References Cited

U.S. PATENT DOCUMENTS

| 4,383,050 | 5/1983 | Nissen et al. |  |
|---|---|---|---|
| 5,407,967 | * 4/1995 | Williams et al. | 521/130 |
| 5,428,077 | 6/1995 | Lamberts et al. |  |
| 5,488,071 | * 1/1996 | Patterson | 521/114 |
| 5,552,449 | * 9/1996 | Sollers et al. | 521/155 |

FOREIGN PATENT DOCUMENTS

| 43 28 383 | 8/1993 | (DE) . |
| 44 16 838 A 1 | 5/1994 | (DE) . |
| 196 10 262A1 | 3/1996 | (DE) . |
| 51744 | 5/1982 | (EP) . |

* cited by examiner

Primary Examiner—John M. Cooney, Jr.
(74) Attorney, Agent, or Firm—Fernando A. Borrego

(57) ABSTRACT

Thermally stable rigid foams based on isocyanate can be produced by reacting a) polyisocyanates with
b) compounds containing at least two hydrogen atoms which can react with isocyanate groups,
c) water, in the presence of
d) physically acting blowing agents, in the presence or absence of
e) catalysts and auxiliaries and/or additives, wherein the component b) comprises
   bi) at least one polyether alcohol having a functionality of at least 1.5 and a hydroxyl number of from 10 to 100 mg KOH/g in an amount of from 0.2 to 80% by mass, based on b), and
   bii) at least one polyester alcohol in an amount of from 5 to 90% by mass, based on b),
   the water c) is present in an amount of at most 2% by mass, based on the sum of the components b) to e), and the component d) used comprises hydrocarbons and/or fluorine-containing hydrocarbons in an amount of from 5 to 30% by mass, based on the sum of the components b) to e).

13 Claims, No Drawings

THERMALLY STABLE RIGID FOAMS BASED ON ISOCYANATE AND HAVING LOW BRITTLENESS AND LOW THERMAL CONDUCTIVITY

The present invention relates to thermally stable rigid foams based on isocyanate and having low brittleness and low thermal conductivity, which foams have been produced without use of blowing agents which damage the ozone layer.

The production of rigid foams based on isocyanate as thermal insulation material has been known for a long time. The most important chemical starting materials for such compounds are polyfunctional isocyanates. Chemical structures formed from the polyisocyanates can be polyurethanes, polyureas, polyisocyanurates and also further isocyanate adducts such as allophanates, biurets, carbodiimides and their isocyanate adducts, oxazolidones, polyimides, polyamides, etc. The type of these structures is controlled by the reaction partners of the isocyanates, the catalysis and the reaction conditions.

These isocyanate adducts are frequently summarized under the term rigid polyurethane (PUR) foams, since the polyurethanes are the most widespread and most important group of materials among the polyisocyanate adducts. Foams having a significant content of isocyanurate structures are frequently referred to as polyurethane-polyisocyanurate (PUR-PIR) foams.

The production of such foams is described, for example, in the Kunststoff-Handbuch, Volume VII "polyurethane", 3rd Edition, edited by Gunter Oertel, Carl-Hanser-Verlag, Munich, Vienna, 1993.

In recent times, rigid foams having very high long-term thermal stability are being demanded for thermal insulation of pipes conducting very hot media. They should withstand temperatures of 180° C. for more than 10 years. This means that, in a hot storage experiment, the foams have to remain without detectable damage for 4 weeks at 200° C. or for 2 weeks at 220° C. Such high-performance materials are demanded not only for the insulation of heating pipes but also, for example, for space flight. At the same time, the foams still have to have a very low thermal conductivity at these high temperatures. However, the heat resistance of the foams based on isocyanate is usually limited. If, for example, predominantly urethane groups are present in the foam, long-term heat resistance for more than 10 years can be achieved only at 150° C., which in a storage test corresponds to from 4 to 6 weeks at 180° C., even when very strongly crosslinking polyols are used. At 200 or 220° C., the foam is destroyed after only a few hours in the storage test. Under a mechanical load of 0.04 N/mm$^2$ for 24 hours in accordance with DIN 18164 at a density of 70 kg/m$^3$, these foams are stable up to at most 170° C. In the case of PUR-PIR foams, the thermal stability can be improved with rising polyisocyanate content, but the brittleness of the foams increases greatly. After storage for a number of weeks at 200° C. or higher temperatures, the foam is so brittle that it shatters into small pieces even under small mechanical loads.

A further disadvantage of the previously known rigid foams based on isocyanate is the excessively high thermal conductivity at elevated temperatures.

The lowest thermal conductivity values are achieved using chorofluorocarbons (CFCs) as blowing agents. However, even when using these blowing agents which are no longer permitted owing to their high ozone depletion potential (ODP) and global warming potential (GWP), the thermal conductivity of the rigid foams, eg. as described in GB-A-2,041,953, CH-A-527 855 or EP-A-24 524, increases to an undesirable extent at elevated temperatures.

As an alternative to the very environmentally damaging CFCs, it has been proposed that, for example, blowing agents which have only carbon, hydrogen and fluorine in the molecule be used. A further alternative blowing agent is water. However, even the se foams described, for example, in U.S. Pat. No. 5,380,768 are stable for 10 years only up to about 140° C. at the customary densities in the range from 60 to 80 kg/m$^3$.

Hydrocarbons, for example pentanes, are likewise suitable as alternative physical blowing agents, but usually also lead to rigid foams having increased thermal conductivities. In addition, the flowability of such foams, as are described, for example, in DE-A-42 22 519, is very restricted.

All previous foam formulations do not meet the requirements for high heat resistance combined with low brittleness and low thermal conductivity even at high temperatures.

It is an object of the present invention to provide rigid foams based on isocyanate which simultaneously have a high thermal stability and low thermal conductivity and low brittleness at high temperature, can be produced using blowing agents which are not environmentally damaging and can be produced using the conventional technology for producing such rigid foams.

We have found that this object is achieved by the joint use of
- a) polyether alcohols having a functionality of at least 1.5, preferably from 2.5 to 3.5, and a hydroxyl number of from 10 to 100 mg KOH/g, preferably from 25 to 50 mg KOH/g, in an amount of from 0.2 to 80% by mass, preferably from 1 to 70% by mass and particularly preferably from 20 to 60% by mass, in each case based on the polyols,
- b) polyester alcohols in an amount of from 5% by mass to 90% by mass, preferably from 20% by mass to 60% by mass, based on the polyols,
- c) water in an amount of at most 2% by mass, preferably from 0.2 to 1.6% by mass and particularly preferably from 0.3 to 1% by mass, based on the polyol component, and
- d) physically acting blowing agents composed of the elements carbon and hydrogen and/or of the elements carbon, hydrogen and fluorine in an amount of from 5 to 30% by mass, preferably from 10 to 25% by mass, based on the polyol component.

The present invention accordingly provides rigid foams based on isocyanate and having high thermal stability and low thermal conductivity and low brittleness at high temperatures, able to be produced by reacting
- a) polyisocyanates with
- b) compounds containing at least two hydrogen atoms which can react with isocyanate groups,
- c) water, in the presence of
- d) physically acting blowing agents, in the presence or absence of
- e) catalysts and auxiliaries and/or additives, wherein the component b) comprises
    - bi) at least one polyether alcohol having a functionality of at least 1.5, preferably from 2.5 to 3.5, and a hydroxyl number of from 10 to 100 mg KOH/g, preferably from 25 to 50 mg KOH/g, in an amount of from 0.2 to 80% by mass, preferably from 1 to 70% by mass and particularly preferably from 20 to 60% by mass, based on the component b), and bii) at least one polyester alcohol in an amount of from 5 to 90% by mass, preferably from 20 to 60% by mass, in each case based on b), the component c) is used in an amount of at most 2% by mass, preferably from 0.2 to 1.6% by mass and particularly preferably from 0.3 to 1% by mass, based on the sum of the components b) to e), and the component d) used comprises hydrocarbons and/or fluorine-containing hydrocarbons in an amount of from 5 to 30% by mass, preferably from 10 to 25% by mass, based on the sum of the components b) to e).

As polyether alcohols bi), preference is given to using polyether alcohols which can be prepared according to methods known per se by addition of propylene oxide and/or ethylene oxide onto 2-functional or polyfunctional initiator molecules, as is described, for example, in the Kunststoffhandbuch, loc. cit., pages 57 to 67.

Suitable initiator molecules are, apart from water, all organic molecules containing Zerewitinoff-active hydrogen atoms. Examples which may be mentioned are ethylene glycol, diethylene glycol, propylene glycol, dipropylene glycol, glycerol, trimethylolpropane (TMP), ethylenediamine, tolylenediamine (TDA), triethanolamine, pentaerythritol, sorbitol, mannitol or sucrose. Preference is given to from 2- to 3-functional polyols.

It is also possible to use mixtures of polyols as component bi). These are obtained, for example, by using initiator mixtures, for example the addition of small amounts of water to the organic initiator molecules. The mixing of polyols is also possible. Adducts of propylene oxide and ethylene oxide onto glycerol or TMP are preferably used as component bi). The alkylene oxides can be randomly distributed in the chains or be present as blocks, preferably as terminal ethylene oxide blocks.

The polyester alcohols used according to the present invention are preferably prepared by reacting polyfunctional alcohols with aromatic, at least bifunctional organic acids and/or at least bifunctional organic acids containing double bonds and/or at least bifunctional aliphatic carboxylic acids. The hydroxyl number of the polyester alcohols is preferably above 150 mg KOH/g, in particular in the range from 200 to 600 mg KOH/g.

Examples of polyester alcohols according to the present invention are reaction products of phthalic acid and/or terephthalic acid and/or isophthalic acid and/or adipic acid and/or oleic acid and/or ricinoleic acid with glycerol and/or trimethylolpropane and/or ethylene glycol and/or diethylene glycol and/or propylene glycol and/or dipropylene glycol and/or pentaerythritol.

Preference is given to polyester alcohols having fatty acid esters, particularly those having one or more double bonds in the molecule, particularly preferably those having unsaturated fatty acids, aromatic dicarboxylic acids and aliphatic dicarboxylic acids in one molecule.

Physically acting blowing agents used are, as described above, hydrocarbons and fluorinated hydrocarbons.

For the purposes of the present invention, hydrocarbons are those compounds which contain only the elements carbon and hydrogen in the molecule. For the rigid foams of the present invention, particular preference is given to those which have from 3 to 10 carbon atoms in the molecule, in particular pentanes, preferably cyclopentane.

As fluorinated hydrocarbons, particular preference is given to those having from 2 to 6 carbon atoms in the molecule, for example pentafluoropropane, pentafluorobutane and tetrafluoroethane.

The physically acting blowing agents mentioned can be used either individually or as mixtures.

It is also possible to use further halogen-free, physically acting blowing agents in admixture with the hydrocarbons and fluorinated hydrocarbons described. Examples are methyl formate, methylal, low molecular weight alcohols, diethyl ether, acetone.

Apart from the components bi) and bii), further compounds containing active hydrogen atoms can be present in the component b) in an amount of at most 50% by mass, based on the mass of the component b).

These can be, on the one hand, the polyols known and customary for producing rigid foams, for example polyether alcohols having a functionality of at least 3, preferably at least 3.5, and a hydroxyl number of greater than 100 mg KOH/g, in particular greater than 300 mg KOH/g, able to be prepared by addition of ethylene oxide and/or, in particular, propylene oxide onto at least 4-functional initiator substances, for example aromatic amines such as tolylenediamine or diphenylmethanediamine, or polyfunctional hydroxyl-containing compounds such as sorbitol, sucrose, mannitol, lignin, condensates of phenol and formaldehyde.

On the other hand, they can be strongly branched polyester alcohols, preferably having functionalities of from 4 to 10 and hydroxyl numbers of from 150 to 400 mg KOH/g.

The component b) also includes chain extenders and/or crosslinkers. Chain extenders used are bifunctional, low molecular weight alcohols, in particular those having a molecular weight of up to 400, for example ethylene glycol, propylene glycol, butanediol, hexanediol. Crosslinkers used are at least trifunctional, low molecular weight alcohols, for example glycerol, trimethylolpropane, pentaerythritol, sucrose or sorbitol.

The components bi) and bii) according to the present invention can be soluble or insoluble in the other constituents of the component b).

The physically acting blowing agents d) can also be soluble or insoluble in the components b) to e) and their mixture.

As polyisocyanates a), use is made of the customary and known aliphatic and in particular aromatic polyisocyanates. Preference is given to using diphenylmethane diisocyanate (MDI) and, in particular, mixtures of MDI and polyphenylpolymethylene polyisocyanates (crude MDI).

Catalysts used are the known compounds which accelerate the reaction between isocyanate groups and hydroxyl groups, for example tertiary amine catalysts such as dimethylcyclohexylamine, imidazoles, morpholines or heavy metal compounds such as organic tin compounds. If isocyanurate groups are to be formed, additional catalysts which catalyze isocyanurate formulation, for example potassium acetate, are added. Examples of auxiliaries and/or additives are stabilizers, cell regulators, flame retardants or fillers.

Comprehensive information on the individual formative components may be found, for example, in the Kunstoff-Handbuch, loc. cit.

The molar ratio of NCO groups to the hydrogen atoms which can react with NCO groups, known as the index, is from 1.5 to 6, preferably from 2.8 to 4.5, for highly rigid foams and from 1.5 to 2.8 for more flexible rigid foams.

The rigid foams of the present invention have excellent thermal stability. Even at high temperatures, the thermal conductivity is low. Owing to the good flowability, even complicated shapes can be filled with foam.

The foams of the present invention are very suitable for the insulation of long-distance heating pipes or for load-bearing sandwich elements.

The invention is illustrated by the examples below.

Raw Materials Used

Polyols

Polyol 1a

Polyester alcohol prepared from adipic acid/phthalic anhydride/oleic acid in a ratio of 1:2:1 and 1,1,1-trimethylolpropane and having a number average molar mass of 530 g/mol, a hydroxyl number of 385 mg KOH/g and a viscosity at 75° C. of 1370 mpas.

Polyol 1b

Polyester alcohol prepared from castor oil and glycerol and having a hydroxyl number of 500 mg KOH/g.

Polyols 2

Polyol 2a, prepared from glycerol as initiator and propylene oxide as first block and ethylene oxide as terminal block and having a hydroxyl number of 35 mg KOH/g and a viscosity of 850 mPas at 20° C. The mass ratio of propylene oxide to ethylene oxide is 6.4.

Polyol 2b, prepared from trimethylolpropane as initiator and propylene oxide as first block and ethylene oxide as terminal block and having a hydroxyl number of 26.5 mg KOH/g and a viscosity of 1225 mPas at 20° C. The mass ratio of propylene oxide to ethylene oxide is 3.7.

2c, prepared from glycerol as initiator and propylene oxide as first block and ethylene oxide as terminal block and having a hydroxyl number of 28 mg KOH/g and a viscosity of 1130 mPas at 20° C. The mass ratio of propylene oxide to ethylene oxide is 6.1.

2d, prepared from propylene glycol as initiator and propylene oxide and having a hydroxyl number of 55 mg KOH/g and a viscosity of 325 mPas at 20° C.

2e, prepared from a mixture of lignin and monoethylene glycol as initiator and ethylene oxide as first block and propylene oxide as terminal block and having a hydroxyl number of 50 mg KOH/g and a viscosity of 850 mPas at 20° C.

2f, prepared from propylene glycol as initiator and propylene oxide as first block and ethylene oxide as terminal block and having a hydroxyl number of 29 mg KOH/g and a viscosity of 780 mPas at 20° C. The mass ratio of propylene oxide to ethylene oxide is 4.4.

Polyol 3, prepared from 25.2 parts of sorbitol and 74.8 parts of propylene oxide using potassium hydroxide as catalyst and 0.5 parts of water as coinitiator. The hydroxyl number is 495 mg KOH/g, the viscosity at 20° C. is 17,900 mPas and the functionality is 5.

Isocyanate 1

A mixture of diphenylmethane diisocyanate and polyphenylpolymethylene polyisocyanates having an NCO content of 31.7% and a viscosity of 209 mPas at 25° C.

Isocyanate 2

A mixture of diphenylmethane diisocyanate and polyphenylpolymethylene polyisocyanates having an NCO content of 31.5% and a viscosity of 550 mPas at 25° C.

Isocyanate 3

A mixture of diphenylmethane diisocyanate and polyphenylpolymethylene polyisocyanates having an NCO content of 30.5% and a viscosity of 2200 mPas at 25° C.

Production and Testing of the Rigid Polyurethane-polyisocyanurate Foams

Foaming in a Cup:

A and B components were thermostatted at 20° C.+/−0.5 K. 78 g of the A and B component were mixed for 10 seconds in a cardboard cup having a capacity of about 660 ml using a laboratory stirrer (rotational speed of 1750 rpm) provided with an impeller from Vollrath (diameter: 65 mm). The ratio of A to B corresponded to that of the respective formulation. The A component was a premix of the polyols used, auxiliaries and the blowing agent while the B component consisted of the polyisocyanate. Cream time, rise time and fiber time were measured in a known manner on the rising foam and the foam density, also referred to as density in the tables, was measured in a known manner on the cured foam. The brittleness was assessed manually. The fineness of the cells was compared visually and estimated as "fine-celled" (FC) and "very fine-celled" (VFC). Comparison with microscopic measurements shows that the cell diameter for "FC" is from 300 $\mu$m to 400 $\mu$m and for "VFC" is less than or equal to 250 $\mu$m.

Production of Rigid Foam Moldings and Their Testing

Mixing was carried out, unless otherwise indicated, using a PUROMAT® HD 30 high-pressure foaming machine from Elastogran.

The mixing ratio was set so as to correspond to the formulation.

576 g of the mixture of A component and isocyanate leaving the mixing head were poured into a 300 mm×400 mm×80 mm mold (9.6 l mold) heated to 45° C. and the mold was subsequently closed tightly. The foam was formed with a compaction of from 1.1 to 2.0. The overall density of the molding was then 60+/−1 kg/m³. In other variants, an overall density of 70+/−1 kg/m³ or 80+/−1 kg/m³ was achieved by weighing 672 g or 768 g of the foaming mixture in the same mold, with the compaction being from 1.5 to 2. The NCO index, viz. the molar ratio of NCO to hydrogen-active groups, and the fiber time were kept constant for comparative examples and examples according to the present invention.

After a demolding time of 30 minutes, test specimens was sawn from the interior of the foam block after 25 hours in order to measure the thermal conductivity and the heat distortion resistance.

In a further variant, the foam leaving the machine was either free-foamed in a cubic 10.5 l mold which was open at the top and had an edge length of 21.9 cm or small shots were placed on top of one another in layers having a thickness of about 2 cm.

In the case of machine foam, very fine cells of <150 $\mu$m can be produced using the formulations according to the present invention; the size of the cells was designated as "VFC" or described by the value determined directly by microscopy.

The thermal conductivity at room temperature was measured using an ANACON model 88 instrument from Anacon, St. Peters Road, Maidenhead, Berkshire, England at a mean temperature of 23.9° C. (gradient: 37.7° C./10° C.) and the thermal conductivity at elevated temperature was measured using a Rapid-k VT 400 instrument from Holometrix Inc., Boston, USA. In this measurement, the temperature gradient can be varied within a wide range and is also indicated in the tables.

The thermal conductivities were measured 24 hours after foaming and also after storage open to diffusion for 120 hours at 80° C.

The heat distortion resistance was measured as percent deformation in accordance with DIN 18164 on specimens having dimensions of 50 mm×50 mm×50 mm after loading at 0.04 N/mm² for 24 hours. The test temperatures are indicated in the tables. For some PUR-PIR formulations, 2.5 liter aluminum pressure flasks were charged with 250 g of the foaming mixture (corresponds to an overall density of 100 kg/m³), closed tightly and stored at 200° C. for 4 weeks, sometimes at 220° C. for 2 weeks (flask test). The foam was subsequently assessed visually.

In manual foaming experiments, correspondingly smaller Al flasks having a volume of 0.5 l were used with 50 g of reaction mixture.

The following tables show the results of the foaming tests according to the present invention compared to the examples which are not according to the present invention:

EXAMPLES 1 to 6 (foaming in a cup)

It can be seen from Examples 1 to 6 that only the combination of polyols according to the present invention gives relatively non-brittle, ductile foams having very fine cells as a prerequisite for a low thermal conductivity.

Rigid PUR-PIR Foam Formulations

Parts are by mass, stabilizers are from Goldschmidt FC=Fine-celled, VFC=Very fine-celled, B=Brittle, VEP=Very easily pulverizable, ie. extraordinarily brittle, T=Tough, ie. can be deformed without destruction, C=Comparative example

| Example | 1 (C) | 2 (C) | 3 | 4 | 5 | 6 |
|---|---|---|---|---|---|---|
| Polyol 1a | 57.22 | 25.61 | 25.61 | 25.61 | 25.61 | 25.61 |
| Polyol 3 | | 31.61 | | | | |
| Polyol 2a | | | 31.61 | | | |
| Polyol 2b | | | | 31.61 | | |
| Polyol 2c | | | | | 31.61 | |
| Polyol 2d | | | | | | 31.61 |
| Dipropylene glycol | 16.65 | 16.65 | 16.65 | 16.65 | 16.65 | 16.65 |
| Ethylene glycol | 2.72 | 2.72 | 2.72 | 2.72 | 2.72 | 2.72 |
| Stabilizer mixture | 2.56 | 2.56 | 2.56 | 2.56 | 2.56 | 2.56 |
| Water | 0.38 | 0.38 | 0.38 | 0.38 | 0.38 | 0.38 |
| Potassium acetate | 2.41 | 2.41 | 2.41 | 2.41 | 2.41 | 2.41 |
| Tertiary amine | 0.26 | 0.26 | 0.26 | 0.26 | 0.26 | 0.26 |
| Cyclopentane | 17.80 | 17.80 | 17.80 | 17.80 | 17.80 | 17.80 |
| Total | 100.00 | 100.00 | 100.00 | 100.00 | 100.00 | 100.00 |
| Isocyanate 1 | 300 | 300 | 300 | 300 | 300 | 300 |
| Cream time in s | 17 | 15 | 8 | 19 | 17 | 18 |
| Fiber time in s | 26 | 25 | 29 | 29 | 29 | 28 |
| Rise time in s | 40 | 39 | 43 | 44 | 43 | 42 |
| Foam density in kg/m³ | 70 | 66 | 65 | 63 | 68 | 66 |
| Brittleness | VEP | VEP | T | T | T | T |
| Foam structure | FC | FC | VFC | VFC | VFC | VFC |

EXAMPLES 7 to 10
Foaming in a Cup/Manual Mixing For Flask Test

Rigid PUR-PIR foam formulations, parts are by mass, stabilizers from Goldschmidt, FC=Fine-celled, VFC=Very fine-celled, T=Tough, ie. deformable without destruction, C=Comparative example

| Example | 7 (C) | 8 | 9 | 10 |
|---|---|---|---|---|
| Polyol 1a | 31.14 | 31.14 | 31.14 | |
| Polyol 1b | | | | 31.14 |
| Polyol 2a | 38.47 | 38.47 | 38.47 | 38.47 |
| Dipropylene glycol | 20.25 | 20.25 | 20.25 | 20.25 |
| Ethylene glycol | 3.30 | 3.30 | 3.30 | 3.30 |
| Stabilizer mixture | 3.12 | 3.12 | 3.12 | 3.12 |
| Water | 0.47 | 0.47 | 0.47 | 0.47 |
| Potassium acetate | 2.93 | 2.93 | 2.93 | 2.93 |
| Tertiary amine | 0.32 | 0.32 | 0.32 | 0.32 |
| Total | 100.00 | 100.00 | 100.00 | 100.00 |
| R 11 | 56.3 | | | |
| Isopentane | | 17.0 | | |
| Cyclopentane | | | 17.0 | 17.0 |
| Isocyanate 1 | 390 | 390 | 390 | 390 |
| Cream time in s | 17 | 13 | 18 | 24 |
| Fiber time in s | 28 | 23 | 23 | 40 |
| Rise time in s | 39 | 39 | 36 | 57 |
| Foam density in kg/m³ | 51 | 52 | 70 | 76 |
| Brittleness | T | T | T | T |
| Foam structure | FC | FC | VFC | VFC |
| Flask test 2 weeks, 200° C. | Foam completely black, destroyed | Foam light-colored, firm, 1 crack | Foam light-colored, firm | Foam light-colored, firm |

EXAMPLES 11 to 14
Foaming by Machine

Rigid PUR-PIR formulations, parts are by mass, stabilizers from Goldschmidt, PUROMAT® SV 20/2, free-foaming in 10.5 l cube and foaming in molds TC=Thermal conductivity in mW/mK, HDR=Heat distortion resistance in accordance with DIN 18164; 0.04 N/mm² loading, 24 h. "Free"=Free-foamed, temperature gradients in TC measurements: TC 23° C.: 10° C./36° C., TC 95° C. (specimen heated at 80° C. for 120 h while open to diffusion="heated"): 140° C./50° C., C=comparative example

| Example | 11 (C) | 12 | 13 | 14 | 14a |
|---|---|---|---|---|---|
| Polyol 1a | 25.61 | 25.61 | 25.61 | 25.61 | 25.61 |
| Polyol 2a | 31.62 | 31.62 | 31.62 | 31.62 | 31.62 |
| Dipropylene glycol | 16.65 | 16.65 | 16.65 | 16.65 | 16.65 |
| Ethylene glycol | 2.71 | 2.71 | 2.71 | 2.71 | 2.71 |
| Stabilizer mixture | 2.56 | 2.56 | 2.56 | 2.56 | 2.56 |
| Water | 0.38 | 0.38 | 0.38 | 0.38 | 0.38 |
| Potassium acetate | 2.41 | 2.41 | 2.41 | 2.41 | 2.41 |
| Tertiary amine | 0.26 | 0.26 | 0.26 | 0.26 | 0.26 |
| R 11 | 34.8 | | | | |
| Cyclopentane | | 17.8 | 17.8 | 17.8 | |
| HFC 245 fa | | | | | 34.8 |
| Total | 117.00 | 100.00 | 100.00 | 100.00 | 117.00 |
| Isocyanate 1 | 300 | 300 | | | 300 |
| Isocyanate 2 | | | 300 | | |
| Isocyanate 3 | | | | 300 | |
| Cream time in s | 7 | 6 | 5 | 8 | 7 |

-continued

| Example | 11 (C) | 12 | 13 | 14 | 14a |
|---|---|---|---|---|---|
| Fiber time in s | 11 | 9 | 9 | 12 | 12 |
| Rise time in s | 20 | 18 | 18 | 20 | 19 |
| "Free" density in kg/m³ | 37 | 34,9 | 38,7 | 48 | 38 |
| Properties for 9.6 l mold | | | | | |
| Density, kg/m³ | 70 | 70 | 70 | 100 | 70 |
| TC 23° C., 7 days | 18.4 | 19.9 | 19.9 | | 19.0 |
| TC 23° C., heated | 25.6 | 24.4 | 24.9 | 28.4 | 24.0 |
| TC, 95° C., heated | 37.3 | 35.3 | 34.7 | — | 35.0 |
| Cell diameter, μm | 230 | 133 | 125 | 130 | 135 |
| HDR, 200° C., % | 9.3 | 8.2 | 3.2 | 2.7 | 4.8 |
| Flask test 4 weeks, 200° C. | Foam black, destroyed | Foam light-colored | Foam firm, cracks | Foam firm, not destroyed | Foam firm, not destroyed |
| 2 weeks, 220° C. | Foam totally destroyed | Brown, firm, cracks | Brown, firm, cracks | — | — |

EXAMPLES 15 to 18

Foaming in a Cup

Manual mixing for flask test, blowing agent mixtures in parts by mass, C=Comparative example

| Example | 15 (C) | 16 | 17 | 18 |
|---|---|---|---|---|
| Polyol 1b | 31.14 | 31.14 | 31.14 | 31.14 |
| Polyol 2a | 38.47 | 38.47 | 38.47 | 38.47 |
| Dipropylene glycol | 20.25 | 20.25 | 20.25 | 20.25 |
| Ethylene glycol | 3.30 | 3.30 | 3.30 | 3.30 |
| Stabilizer mixture | 3.12 | 3.12 | 3.12 | 3.12 |
| Water | 0.47 | 0.47 | 0.47 | 0.47 |
| Potassium acetate | 2.93 | 2.93 | 2.93 | 2.93 |
| Tertiary amine | 0.32 | 0.32 | 0.32 | 0.32 |
| Total | 100.00 | 100.00 | 100.00 | 100.00 |
| R 11 | 56.3 | | | |
| Isopentane/acetone 1:1 | | 17. 5 | | |
| Isopentane/methylformate 1:1 | | | 17.5 | 21.1 |
| Isocyanate 1 | 390 | 390 | 390 | 390 |
| Cream time in s | 17 | 17 | 14 | 15 |
| Fiber time in s | 28 | 24 | 21 | 21 |
| Rise time in s | 39 | 34 | 30 | 32 |
| Foam density in kg/m³ | 51 | 62 | 66 | 57 |
| Flask test 2 weeks, 200° C. | Foam black, completely destroyed | Foam yellow, firm, 1 crack | Foam pale yellow | Foam pale yellow |

EXAMPLES 19 to 21

Foaming in a cup

Rigid PUR-PIR formulations, flexible variant, parts are by mass, stabilizers from Goldschmidt FC=Fine-celled, VFC=Very fine-celled according to the visual estimation. At a higher water content, the HDR at 200° C. remains below 10% deformation despite a lower density.

Flow test: 100 g of foam mixture in a tube having a diameter of 46 mm. Reported as flow length in cm.

C=Comparative example

| Example | 19 (C) | 20 | 21 (C) |
|---|---|---|---|
| Polyol 1a | 25.61 | 25.61 | 25.71 |
| Polyol 2a | 31.62 | 31.62 | 31.77 |
| Dipropylene glycol | 16.65 | 16.65 | 16.72 |
| Ethylene glycol | 2.71 | 2.71 | 2.73 |
| Stabilizing mixture | 2.56 | 2.56 | 2.58 |
| Water | 0.38 | 1.6 | 0.0 |
| Potassium acetate | 2.41 | 2.41 | 2.43 |
| Tertiary amine | 0.26 | 0.26 | 0.26 |
| Cyclopentane | 17.8 | 16.58 | 17.8 |
| Total | 100.00 | 100.00 | 100.00 |
| Density in kg/cm³ | 62 | 39 | 85 |
| Isocyanate 2 | 320 | 320 | |
| HDR, 200° C., in % | 6.8 | 9.2 | |
| Hardness | Rigid | Somewhat more flexible | Rigid |
| Flow behavior on foaming in cm | 96 | 120 | 41 |

We claim:

1. A thermally stable rigid foam based on isocyanate comprising the reaction product of a) polyisocyanates with b) compounds containing at least two hydrogen atoms which are reactive toward isocyanate groups and, c) water, in the presence of d) physically acting blowing agents, and optionally, e) catalysts and auxiliaries and/or additives, wherein the component b) comprises bi) at least one polyether alcohol having a functionality of at least 1.5 and a hydroxyl number of from 10 to 100 mg KOH/g in an amount of from 20 to 60% by mass, based on b), and bii) at least one polyester alcohol in an amount of from 5 to 90% by mass, based on b), said at least one polyester alcohol having a hydroxyl number of from 200 to 600 mg KOH/g, and the water c) is present in an amount of at most 2% by mass, based on the sum of components b) to e), and the component d) comprises hydrocarbons and/or fluorine-containing hydrocarbons in an amount of from 5 to 30% by mass, based on the sum of the components b) to e).

2. A thermally stable rigid foam based on isocyanate as claimed in claim 1, wherein the polyether alcohol bi) has a functionality of from 2.5 to 3.5.

3. A thermally stable rigid foam based on isocyanate as claimed in claim 1, wherein the polyether alcohol bi) has a hydroxyl number of from 25 to 50 mg KOH/g.

4. A thermally stable rigid foam based on isocyanate as claimed in claim 1, wherein the polyether alcohol is used in an amount of from 1 to 70% by mass, based on the component b).

5. A thermally stable rigid foam based on isocyanate as claimed in claim 1, wherein the polyether alcohol bi) is prepared by addition of ethylene oxide and/or propylene oxide onto H-functional initiator substances.

6. A thermally stable rigid foam based on isocyanate as claimed in claim 1, wherein the polyether alcohol bi) is prepared by addition of ethylene oxide and/or propylene oxide onto glycerol and/or trimethylolpropane.

7. A thermally stable rigid foam based on isocyanate as claimed in claim 1, wherein the polyester alcohols bii) is prepared by reacting fatty acids with polyfunctional alcohols.

8. A thermally stable rigid foam based on isocyanate as claimed in claim 1, wherein the polyester alcohols bii) is prepared by reacting unsaturated fatty acids with polyfunctional alcohols.

9. A thermally stable rigid foam based on isocyanate as claimed in claim 1, wherein the polyester alcohols bii) are selected from the group consisting of unsaturated fatty acids, aromatic dicarboxylic acids and aliphatic dicarboxylic acids.

10. A thermally stable rigid foam based on isocyanate as claimed in claim 1, wherein the water c) is used in an amount of from 0.1 to 2% by mass, based on the sum of b) to e).

11. A thermally stable rigid foam based on isocyanate as claimed in claim 1, wherein the water is used in an amount of from 0.2 to 1.6% by mass, based on the sum of b) to e).

12. A thermally stable rigid foam based on isocyanate as claimed in claim 1, wherein the physically acting blowing agents d) comprise hydrocarbons and/or fluorinated hydrocarbons.

13. A thermally stable rigid foam based on isocyanate as claimed in claim 1, wherein the physically acting blowing agents d) are used in an amount of from 5 to 30% by mass, based on the sum of b) to e).

* * * * *